US012006561B2

(12) United States Patent
Uehara et al.

(10) Patent No.: US 12,006,561 B2
(45) Date of Patent: Jun. 11, 2024

(54) MARTENSITIC STAINLESS STEEL FOR FUEL INJECTION MEMBER AND FUEL INJECTION MEMBER USING SAME

(71) Applicant: Proterial, Ltd., Tokyo (JP)

(72) Inventors: Toshihiro Uehara, Tokyo (JP); Akihiro Toji, Tokyo (JP)

(73) Assignee: Proterial, Ltd., Tokyo (JP)

( * ) Notice: Subject to any disclaimer, the term of this patent is extended or adjusted under 35 U.S.C. 154(b) by 671 days.

(21) Appl. No.: 16/315,157

(22) PCT Filed: Jul. 5, 2017

(86) PCT No.: PCT/JP2017/024615

§ 371 (c)(1),
(2) Date: Jan. 4, 2019

(87) PCT Pub. No.: WO2018/008674

PCT Pub. Date: Jan. 11, 2018

(65) Prior Publication Data

US 2019/0211429 A1 Jul. 11, 2019

(30) Foreign Application Priority Data

Jul. 6, 2016 (JP) ................................ 2016-133970
Mar. 3, 2017 (JP) ................................ 2017-040425

(51) Int. Cl.

| | |
|---|---|
| ***C22C 38/54*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/42*** | (2006.01) |
| ***C22C 38/44*** | (2006.01) |
| ***C22C 38/46*** | (2006.01) |
| ***C22C 38/48*** | (2006.01) |
| ***C22C 38/50*** | (2006.01) |
| ***F02M 61/16*** | (2006.01) |

(52) U.S. Cl.

CPC .............. *C22C 38/54* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *F02M 61/166* (2013.01); *F02M 2200/05* (2013.01); *F02M 2200/9053* (2013.01)

(58) Field of Classification Search

CPC ....... C22C 38/54; C22C 38/00; C22C 38/001; C22C 38/002; C22C 38/02; C22C 38/04; C22C 38/06; C22C 38/42; C22C 38/44; C22C 38/46; C22C 38/48; C22C 38/50; F02M 61/166; F02M 2200/05; F02M 2200/9053

See application file for complete search history.

(56) References Cited

U.S. PATENT DOCUMENTS 5,714,114 A * 2/1998 Uehara .................. C22C 38/20 148/325
6,235,237 B1 * 5/2001 Osing ...................... C21D 1/25 420/67
2005/0271541 A1 * 12/2005 Hamano ................ C22C 38/02 420/61
2010/0054649 A1 * 3/2010 Yamada .................. F16C 33/62 420/64
2010/0158745 A1 * 6/2010 Ohishi ..................... C21D 1/76 420/67

FOREIGN PATENT DOCUMENTS

| | | |
|---|---|---|
| EP | 1997921 | 12/2008 |
| JP | S6267219 | 3/1987 |
| JP | H0658218 | 3/1994 |
| JP | H0748653 | 2/1995 |
| JP | H0849512 | 2/1996 |
| JP | H08284776 | 10/1996 |
| JP | 2001049399 | 2/2001 |
| JP | 2001049399 A * | 2/2001 |
| JP | 2007277639 | 10/2007 |
| JP | 2008038167 A * | 2/2008 |
| JP | 2008133499 | 6/2008 |

(Continued)

OTHER PUBLICATIONS

Oishi, JP 2008038167: Martensitic Stainless Steel Used for Fuel Injection Component of Diesel Engine, Is Sintered Alloy Powder Comprising Metal Structure Having Sulfide Group Inclusion With Preset Size, Area Ratio and Average Diameter in Cross-section, 2008, JPO (Year: 2008).*

(Continued)

*Primary Examiner* — Anthony M Liang
*Assistant Examiner* — Jacob J Gusewelle
(74) *Attorney, Agent, or Firm* — JCIPRNET

(57) ABSTRACT

A martensitic stainless steel for a fuel injection member contains, in mass %, at least 0.35% and less than 0.50% of C, more than 0.20% and at most 0.40% of Si, 0.2-0.4% of Mn, 0.25% or less of Ni, 15.0-17.0% of Cr, more than 2.0% and at most 3.0% of Mo, 0.1-0.3% of W, 0.001-0.003% of B, and at least 0.15% and less than 0.20% of N, with the remainder comprising Fe and inevitable impurities, which include 0-0.025% of P, 0-0.005% of S, 0-0.2% of Cu, 0-0.05% of Al, 0-0.02% of Ti, 0-0.02% of Nb, 0-0.15% of V, 0-0.003% of O, and 0-0.001% of H.

3 Claims, No Drawings

(56) References Cited

FOREIGN PATENT DOCUMENTS

| | | | | | |
|---|---|---|---|---|---|
| JP | 2010077525 | | | 4/2010 | |
| JP | 2010077525 | A | * | 4/2010 | .............. F16C 33/62 |
| JP | 2019014916 | A | * | 1/2019 | |
| KR | 20030013806 | A | * | 2/2003 | |

OTHER PUBLICATIONS

Yamada, JP2010077525: Martensitic Stainless Steel and Roller Bearing,2010, JPO (Year: 2010).*
ASM International (Vacuum Induction Melting), vol. 15 Handbook Committee, p. 1-8 DOI: 10.1361/asmhba0005200 2008 (Year: 2008).*
"Office Action of Germany Counterpart Application," dated Feb. 15, 2019, with English translation thereof, p. 1-p. 14.
"International Search Report (Form PCT/ISA/210)" of PCT/JP2017/024615, dated Oct. 3, 2017, with English translation thereof, pp. 1-4.

* cited by examiner

MARTENSITIC STAINLESS STEEL FOR FUEL INJECTION MEMBER AND FUEL INJECTION MEMBER USING SAME

CROSS-REFERENCE TO RELATED APPLICATION

This application is a 371 application of International PCT application serial no. PCT/JP2017/024615, filed on Jul. 5, 2017, which claims the priority benefit of Japan application no. 2016-133970, filed on Jul. 6, 2016, and Japan application no. 2017-040425, filed on Mar. 3, 2017. The entirety of each of the above-mentioned patent applications is hereby incorporated by reference herein and made a part of this specification.

TECHNICAL FIELD

The present invention relates to a martensitic stainless steel for a fuel injection member such as an engine for an automobile or the like, and a fuel injection member using the same.

BACKGROUND ART

In an internal combustion engine such as an engine for an automobile or the like, in recent years, due to improvement in fuel consumption of automobiles, tightening of regulations on exhaust gas, or the like, use of engines in which exhaust gas recirculation (EGR) systems using a high temperature exhaust gas are installed has increased. In addition, due to the worldwide spread of automobiles, there are increasing cases where it is necessary to use fuels with a lot of impurities depending on the region. Due to recirculation of exhaust gas and use of fuels with a large amount of impurities, fuel injection members are being exposed to more severely corrosive environments than in the past, and improvement in corrosion resistance as well as having a high degree of hardness is required.

Conventionally, as a martensitic stainless steel that made a high degree of hardness and a high corrosion resistance compatible, a high nitrogen martensitic stainless steel to which N is actively added has been developed (Patent Literature 1 to 4).

CITATION LIST

Patent Literature

[Patent Literature 1]
Japanese Unexamined Patent Application Publication No. 2001-049399
[Patent Literature 2]
Japanese Unexamined Patent Application Publication No. 2008-133499
[Patent Literature 3]
Japanese Unexamined Patent Application Publication No. 2007-277639
[Patent Literature 4]
Japanese Unexamined Patent Application Publication No. 2010-077525

SUMMARY OF INVENTION

Technical Problem

A high hardness martensitic stainless steel having a good pitting corrosion resistance disclosed in Japanese Unexamined Patent Application Publication No. 2001-49399 (Patent Literature 1) is a martensitic stainless steel having both of high pitting corrosion resistance and hardness due to adding a large amount of N. In order to minimize generation of δ (delta) ferrite due to addition of Mo, a component balance is optimized in a state in which Cu is also added in order to improve pitting corrosion resistance while actively adding Ni. However, no consideration is given to the amount of 0 that generates oxide-based inclusions.

A high hardness martensitic stainless steel disclosed in Japanese Unexamined Patent Application Publication No. 2008-133499 (Patent Literature 2) is also a martensitic stainless steel having both of a high degree of hardness and corrosion resistance due to adding a large amount of N. However, since the amount of N is as much as 0.2% or more, quenching cracks easily occur, and secular distortion may occur due to quenching conditions in which a small amount of residual austenite remains when performing addition of B and Si and minimization of the amount of Al and Ti as a countermeasure for preventing quenching cracks. In addition, since the amount of N is large, there is a constraint that N cannot dissolve in a solid solution under atmospheric pressure and needs to be dissolved by pressurized dissolution.

In addition, a martensitic steel disclosed in Japanese Unexamined Patent Application Publication No. 2007-277639 (Patent Literature 3) is also a martensitic stainless steel including a large amount of N, in which a corrosion resistance is improved by adding various elements while obtaining a high degree of hardness by optimizing a total amount of and ratio between C and N, and reduction in quenching cracks is achieved by adding B. However, since reduction in the amount of Mo is curtailed to secure specularity, a corrosion resistance may be insufficient according to an environment.

In addition, a martensitic stainless steel and rolling bearing disclosed in Japanese Unexamined Patent Application Publication No. 2010-077525 (Patent Literature 4) is a martensitic stainless steel including a large amount of N, which makes a high degree of hardness and corrosion resistance compatible. Si is restricted to a lower amount in order to secure hot workability but no consideration is given to the amount of 0 that generates oxide-based inclusions.

Further, in the N-containing martensitic stainless steels disclosed in Patent Literatures 1 to 4, no consideration is given to the amount of H that causes hydrogen embrittlement, which is a concern with high hardness steel in any case. In this way, these high N-containing martensitic stainless steels have individual problems in manufacturability, characteristics, or the like, due to individual component balances.

An objective of the present invention is an intention to provide a martensitic stainless steel for a fuel injection member to which N is added, which is a martensitic stainless steel for a fuel injection member suitable for a fuel injection member such as an engine for an automobile or the like, in which oxide-based inclusions that may become starting points for fatigue and pitting corrosion are able to be minimized, and moreover, in which curtailment of hydrogen embrittlement of a high hardness steel is able to be contributed to, while a good corrosion resistance and a high degree of hardness are able to be maintained simultaneously, and a fuel injection member using the same.

Solution to Problem

In order to solve such problems, the inventor(s) of the present invention conducted intensive research regarding martensitic stainless steel with added N having a specific alloy composition. The results revealed that it is effective to add more Si to obtain good low temperature tempering hardness, it is effective to add more Mo to improve corrosion resistance, it is effective to control the amount of oxygen such that it becomes a low amount in order to improve the pitting corrosion resistance, and that it is effective to reduce the amount of H in order to curtail hydrogen embrittlement which is a concern in high hardness steel, and the present invention has thus been reached.

That is, the present invention provides a martensitic stainless steel for a fuel injection member containing: in mass %, 0.35% or more and less than 0.50% of C, more than 0.20% and 0.40% or less of Si, 0.2 to 0.4% of Mn, 0.25% or less of Ni, 15.0 to 17.0% of Cr, more than 2.0% and 3.0% or less of Mo, 0.1 to 0.3% of W, 0.001 to 0.003% of B, and 0.15% or more and less than 0.20% of N, the remainder being Fe and inevitable impurities, wherein inevitable impurity elements being, 0.025% or less (including 0%) of P, 0.005% or less (including 0%) of S, 0.2% or less (including 0%) of Cu, 0.05% or less (including 0%) of Al, 0.02% or less (including 0%) of Ti, 0.02% or less (including 0%) of Nb, 0.15% or less (including 0%) of V, 0.003% or less (including 0%) of O, and 0.001% or less (including 0%) of H.

In addition, the present invention also provides a fuel injection member using the martensitic stainless steel for a fuel injection member.

Advantageous Effects of Invention

A martensitic stainless steel for a fuel injection member of the present invention can make a high degree of hardness and a corrosion resistance compatible and achieve higher reliability when used in a fuel injection member of an engine for an automobile.

DESCRIPTION OF EMBODIMENTS

First, each of the elements defined by the present invention and contents thereof will be described. Further, the contents are represented in mass % unless the context clearly indicates otherwise.

<C: 0.35% or More and Less than 0.50%>

C is an element required for obtaining a high degree of hardness when generating a martensite structure after quenching of a stainless steel containing 15.0 to 17.0% of Cr. In addition, C is an effective element for obtaining a high degree of hardness and wear resistance by forming carbides through a reaction with a carbide-generating element such as Cr or the like. A sufficient hardness cannot be obtained with these quenching conditions when there is less than 0.35% of C. Meanwhile, when 0.50% or more of C is added, since carbides containing Cr on a grain boundary are easily generated to cause grain boundary corrosion when a cooling speed upon quenching is lowered, 0.35% or more and less than 0.50% of C is used. A preferable lower limit of C is 0.40%. In addition, a preferable upper limit of C is 0.45%.

<Si: More than 0.20% and 0.40% or Less>

Si is an effective and essential element for increasing hardness not only by a small amount of Si as a deoxidation element being added, but also for delaying precipitation of cementite during low temperature tempering. Since there is an insufficient effect of increasing hardness during low temperature tempering at 0.20% or less of Si and a large amount of oxide-based inclusions may be generated to decrease a pitting corrosion resistance or a fatigue strength when more than 0.40% of Si is added, greater than 0.20% and 0.40% or less of Si is used. A preferable lower limit of Si is 0.25%. In addition, a preferable upper limit of Si is 0.30%.

<Mn: 0.2 to 0.4%>

Although Mn may be added in a small amount as a deoxidizing element, since when there is less than 0.2% thereof, an effect thereof is small, whereas even if Mn is added in an amount exceeding 0.4%, no further improvement in an effect thereof can be seen, 0.2 to 0.4% is used. A lower limit of Mn is preferably 0.25%. In addition, an upper limit of Mn is preferably 0.35%.

<Ni: 0.25% or Less>

Ni is an austenite-generating element, which is an essential element for minimizing generation of delta ferrite and improving corrosion resistance. However, when more than 0.25% of Ni is added, since the Al point and the Ms point are lowered because this element is an austenite-generating element, a soft annealing effect is decreased, and since martensitic transformation after quenching is minimized and an amount of remaining austenite is increased which minimizes an increase in hardness, 0.25% or less of Ni is used. Furthermore, when securing addition of Ni, a lower limit of Ni is preferably 0.05%, and a preferable upper limit of Ni is 0.20%.

<Cr: 15.0 to 17.0%>

Cr is an important element that not only improves corrosion resistance by forming a passive film but increases hardness by generating carbides through reaction with C. In addition, like the steel of the present invention, in steel containing a large amount of N, Cr is an important element having an effect of increasing a solid solubility of N and allowing a large amount of N to form a solid solution in a parent phase. When there is less than 15.0% of Cr, since a part of the Cr may be consumed in Cr carbides in steel containing a large amount of C, a Cr concentration in the parent phase is decreased and a sufficient corrosion resistance may not be obtained. Meanwhile, when more than 17.0% of Cr is added, since corrosion resistance and hardness are decreased due to delta ferrite being generated because Cr is a ferrite-generating element, 15.0 to 17.0% of Cr is used. A preferable lower limit of Cr is 16.0%, and more preferably, a lower limit of Cr is 16.3%.

<Mo: More than 2.0% and 3.0% or Less>

Mo is an important element which increases corrosion resistance by strengthening a passive film containing Cr. When there is 2.0% or less of Mo, sufficient corrosion resistance may not be obtained. Meanwhile, since when more than 3.0% of Mo is added, delta ferrite is easily generated because Mo is a ferrite-generating element, and the corrosion resistance and the hardness are decreased, more than 2.0% and 3.0% or less of Mo is used. A preferable lower limit of Mo is 2.2%, and more preferably, a lower limit of Mo is 2.4%. A preferable upper limit of Mo is 2.8%, and more preferably, an upper limit of Mo is 2.7%.

<W: 0.1 to 0.3%>

Like Mo, while W is also an element which increases corrosion resistance, since an effect of W is smaller than that of Mo, a small amount of W is added together with Mo. When there is less than 0.1% of W, an effect of improving corrosion resistance is small, on the other hand, since it is difficult to obtain further improvement in the effects thereof even if there is more than 0.3% of W, 0.1 to 0.3% of W is used. A preferable lower limit of W is 0.15%, and a preferable upper limit of W is 0.25%.

<B: 0.001 to 0.003%>

B is an effective element for improving toughness while strengthening a grain boundary and improving hot workability. If there is less than 0.001% of B, an effect of sufficiently improving hot workability may not be obtained, whereas if B is added in an amount of more than 0.003%, since it forms nitrides or forms a solid solution in carbides to enlarge the curable phase such that toughness is reduced, 0.001 to 0.003% of B is used.

<N: 0.15% or More and Less than 0.20%>

N is an important element for contributing to formation of a stable passive film and improving corrosion resistance, since N forms a solid solution in a parent phase. In addition, since N is an austenite-forming element, an amount of Cr, Mo, or the like, added may be increased within a range in which generation of delta ferrite can be minimized, and since a large amount of Cr or Mo effective for corrosion resistance can be added, N indirectly contributes to improvement in corrosion resistance. When there is less than 0.15% of N, an effect of improving corrosion resistance is insufficient. On the other hand, when 0.20% or more of N is added, since blowholes are easily generated upon solidification beyond a limit at which N can form a solid solution in a parent phase, 0.15% or more and less than 0.20% of N is used. A preferable lower limit of N is 0.16%, and a preferable upper limit of N is 0.19%.

<P: 0.025% or Less (Including 0%)>

P is an impurity element. While preferably there is as little P as possible and 0% thereof is acceptable, a small amount of P is inevitably mixed in from raw materials or the like upon melting. Since P has no detrimental effects such as tempering brittleness or the like when there is 0.025% or less thereof, 0.025% or less of P is used.

<S: 0.005% or Less (Including 0%)>

S is an impurity element. While preferably there is as little S as possible and 0% thereof is acceptable, a small amount of S is inevitably mixed in from raw materials or the like. Since if there is 0.005% or less of S, the amount of sulfide-based inclusions generated is small and there is no adverse effect on corrosion resistance, 0.005% or less of S is used. In order to more reliably minimize an influence exerted by S impurities, an upper limit of S is preferably 0.002%.

<Cu: 0.2% or Less (Including 0%)>

Cu is an impurity element in the steel of the present invention. While preferably there is as little Cu as possible and 0% thereof is acceptable, a small amount of Cu is inevitably mixed in from raw materials or the like. Since when more than 0.2% of Cu is mixed in, hot workability may be decreased and there is a possibility of cracking during hot working, 0.2% or less of Cu is used. In order to more reliably minimize an influence exerted by Cu impurities, an upper limit of Cu is preferably 0.1%.

<Al, Ti, Nu, V>

Al, Ti, Nb and V are impurity elements in the steel of the present invention. While preferably there is as little Al, Ti, Nb and V as possible and 0% thereof is acceptable, a small amount of Al, Ti, Nb and V are inevitably mixed in from raw materials or the like upon dissolution. While these elements may cause deterioration of properties such as hardness, corrosion resistance, or the like, by generating oxides or carbides, in practical use no particularly harmful effects are observed when there is 0.05% or less of Al, 0.02% or less of Ti, 0.02% or less of Nb, and 0.15% or less of V. Accordingly, 0.05% or less of Al, 0.02% or less of Ti, 0.02% or less of Nb, and 0.15% or less of V are used. In order to more reliably minimize influences exerted by Al, Ti, Nb and V impurities, upper limits of Al, Ti, Nb and V are preferably 0.02%, 0.01%, 0.01% and 0.10%, respectively.

<O: 0.003% or Less (Including 0%)>

O is an impurity element which generates oxide-based inclusions in the steel of the present invention. While preferably there is as little O as possible and 0% is acceptable, a small amount of O is inevitably mixed in from raw materials, the atmosphere, or the like, upon dissolution. When more than 0.003% of O is mixed in, since a large amount of oxide-based inclusions are generated which decreases corrosion resistance, fatigue properties, hot workability, and so on, 0.003% or less of O is used. In order to more reliably minimize an influence exerted by 0 impurities, an upper limit of O is preferably 0.002%.

<H: 0.001% or Less (Including 0%)>

H is a harmful element which causes hydrogen embrittlement by segregating in microdefects such as dislocations, grain boundaries, precipitated substances, or the like, in high hardness steel. H, which is an impurity element, needs be minimized to as small an amount as possible and 0% is acceptable. Since H increases susceptibility to hydrogen embrittlement when 0.001% of H is exceeded, 0.001% or less of H is used. In order to more reliably minimize an influence exerted by H of impurities, an upper limit of H is preferably 0.0005%.

<Fe Remainder and Inevitable Impurities>

In order to obtain the martensitic stainless steel of the present invention, Fe is necessary as a main element of the martensite structure constituting a matrix thereof, and thus the remainder is substantially Fe. The remainder is permitted to contain small amounts of inevitable impurities that are not defined above.

Hereinabove, the martensitic stainless steel for a fuel injection member of the present invention is optimum for a fuel injection member and contributes to minimizing oxide-based inclusions that become starting points of fatigue and pitting, and also curtailment of hydrogen embrittlement of high hardness steel, while good corrosion resistance and a high degree of hardness are maintained simultaneously.

Further, in order to simultaneously minimize oxide-based inclusions or the like while decreasing mixing in of the above-mentioned impurity elements as much as possible, for example, adjustment can be performed such that amounts of elements are within the compositional ranges specified for the present invention by combining a method of preventing mixing in of impurities from raw materials as much as possible through careful selection of dissolved raw materials, reduction of moisture or the like adhering to raw materials, or the like, and a method of minimizing non-metal inclusions or the like through reduction of oxygen by adding an appropriate amount of a deoxidizing element, applying a remelting method such as electroslag remelting, or the like.

EXAMPLES

While primary melting in the atmosphere (under atmospheric pressure) was performed, at this time, adhesion of moisture to raw materials was reduced as much as possible in order to reduce mixing in of hydrogen as much as possible while carefully selecting the raw materials. After deoxidation by Si, Mn, or the like, in primary melting, oxide-based inclusions and sulfide-based inclusions were removed as much as possible in a state in which a prescribed amount of N was incorporated through electroslag remelting, and an ingot of Steel No. 1 of the present invention was obtained. Chemical components in Steel No. 1 of the present invention are shown in Table 1. The elements shown in the upper rows are essential elements that are added, and the elements shown in lower rows are impurity elements.

TABLE 1

| (mass %) | | | | | | | | | |
|---|---|---|---|---|---|---|---|---|---|
| No. | C | Si | Mn | Ni | Cr | Mo | W | B | N |
| 1 | 0.44 | 0.27 | 0.30 | 0.10 | 16.57 | 2.47 | 0.19 | 0.0023 | 0.17 |
| | P | S | Cu | Al | Ti | Nb | V | O | H |
| | 0.018 | 0.0004 | 0.02 | 0.006 | 0.002 | 0.01 | 0.04 | 0.0020 | 0.0003 |

Remarks 1: The remainder is Fe and inevitable impurities.

An ingot of Steel No. 1 of the present invention was subjected to a homogenization heat treatment, the ingot was machined into a bar having a diameter of 14 to 33 mm through hot forging and hot rolling, and annealing was performed. Then, a test sample for heat treatment was taken from this and held at 1070 to 1090° C. for 40 minutes, air cooling quenching was performed, subzero treatment was performed at −80° C. for one hour within one hour after cooling, the test sample was further held at 180 to 240° C. for one hour, and air cooling tempering was performed, and then, hardness was measured using a Vickers hardness meter.

In addition, No. 11 as a comparative example (commercially available as JIS SUS 440C) was evaluated. The reason for using SUS 440C as a comparative example is that a high C stainless steel is used for fuel injection members relatively often. For a heat treatment on SUS 440C used herein, SUS 440C was held at 1050° C. for 30 minutes, oil cooling quenching was performed, subzero treatment was performed at −80° C. for one hour within one hour after cooling, and after further holding at 200° C. for one hour, air cooling tempering was performed, and Vickers hardness measurement was performed.

Hardnesses after heat treatment at various quenching temperatures and tempering temperatures are shown in Table 2. Values obtained for the hardnesses of the steel of the present invention were 650 to 700 HV. When compared to using a tempering condition of 180° C., Steel No. 1 of the present invention had 691 to 693 HV, Steel No. 11 of the comparative example had 690 HV, and thus the same high degree of hardness can be obtained for Steel No. 1 of the present invention as for SUS 440C.

TABLE 2

| Steel | Quenching temperature (° C.) | Subzero temperature (° C.) | Tempering temperature (° C.) | Vickers Hardness (HV) | Remarks |
|---|---|---|---|---|---|
| No. 1 | 1070 | −80 | 180 | 693 | Steel of the present invention |
| | | | 200 | 683 | |
| | | | 220 | 670 | |
| | | | 240 | 654 | |
| | 1090 | −80 | 180 | 691 | Steel of the present invention |
| | | | 200 | 683 | |
| | | | 220 | 670 | |
| | | | 240 | 652 | |
| No. 11 | 1050 | −80 | 180 | 690 | Steel of comparative example |

Next, using Steel No. 1 of the present invention, heat treatment conditions with which a high hardness was obtained were selected, and a corrosion resistance evaluation test sample was fabricated. The heat treatment conditions were conditions of, as shown in Table 2, holding at 1090° C. for 40 minutes, performing air cooling quenching, performing subzero treatment at −80° C. for one hour within one hour after cooling, further holding at 180° C. for one hour, and then, performing air cooling tempering. After the heat treatment, the test sample was machined into a round bar test sample having a diameter of 10 mm and a length of 20 mm and immersed in a sulfuric acid solution of pH 3 at 30° C. for 96 hours, and a corrosion weight loss (the weight of the test sample after the corrosion test subtracted from the weight of the test sample before the corrosion test was divided by the surface area of the test sample before the corrosion test) was measured, after that, the test sample was cut in a longitudinal direction, a maximum grain boundary corrosion depth was measured from a cross section thereof, and evaluation of corrosion resistance was thus performed.

Corrosion resistance evaluation was also performed with respect to No. 11 (commercially available as SUS 440C) as a comparative example. For the heat treatment on SUS 440C used herein, after holding at 1050° C. for 30 minutes, oil cooling quenching was performed, subzero treatment was performed at −80° C. for one hour within one hour after cooling, and after further holding at 180° C. for one hour, air cooling tempering was performed.

Corrosion resistance evaluation results are shown in Table 3. In comparison with Steel No. 11 as the comparative example, Steel No. 1 of the present invention had a significantly smaller corrosion weight loss in an aqueous sulfuric acid solution environment and had a satisfactory level of 0.4 $mg/cm^2$ or less. It was made apparent that, while much grain boundary corrosion occurred in Steel No. 11 of the comparative example, grain boundary corrosion did not occur in Steel No. 1 of the present invention and extremely good corrosion resistance was shown. This is because oxide-based inclusions and sulfide-based inclusions were removed in a state in which a prescribed amount of N was incorporated due to electroslag remelting while adjusting the amounts of components.

TABLE 3

| Steel | Quenching temperature (° C.) | Subzero temperature (° C.) | Tempering temperature (° C.) | Corrosion weight loss ($mg/cm^2$) | Maximum grain corrosion depth (μm) | Remarks |
|---|---|---|---|---|---|---|
| No. 1 | 1090 | −80 | 180 | 0.001 | 0 | Steel of the present invention |
| No. 11 | 1050 | −80 | 180 | 1.120 | 179 | Steel of comparative example |

INDUSTRIAL APPLICABILITY

As described above, a martensitic stainless steel for a fuel injection member of the present invention exhibits higher reliability in a case in which a fuel having a large amount of impurities is used, when the martensitic stainless steel is used in a fuel injection member in an engine for an automobile, because a high degree of hardness and corrosion resistance can be made to be compatible.

The invention claimed is:

1. A martensitic stainless steel for a fuel injection member comprising: in mass %, 0.35% or more and less than 0.50% of C, more than 0.20% and 0.40% or less of Si, 0.2 to 0.4% of Mn, more than 0.05% and 0.25% or less of Ni, 15.0 to 17.0% of Cr, more than 2.0% and 3.0% or less of Mo, 0.1 to 0.3% of W, 0.001 to 0.003% of B, and 0.15% or more and less than 0.20% of N, the remainder being Fe and inevitable impurities, wherein inevitable impurity elements being, 0.025% or less including 0% of P, 0.005% or less including 0% of S, 0.1% or less including 0% of Cu, 0.05% or less including 0% of Al, 0.02% or less including 0% of Ti, 0.02% or less including 0% of Nb, 0.15% or less including 0% of V, 0.003% or less and more than 0% of 0, and 0.001% or less and more than 0% of H.

2. A fuel injection member that uses the martensitic stainless steel for a fuel injection member according to claim 1.

3. The martensitic stainless steel for a fuel injection member according to claim 1, wherein the martensitic stainless steel comprises 0.0005% or less and more than 0% of H.

* * * * *